(12) United States Patent
Norris

(10) Patent No.: US 6,918,357 B2
(45) Date of Patent: Jul. 19, 2005

(54) STEPPER MOTOR DRIVEN FLUID VALVE AND ASSOCIATED METHOD OF USE

(75) Inventor: Robert R. Norris, Dublin, OH (US)

(73) Assignee: Ranco Incorporated of Delaware, Wilmington, DE (US)

(*) Notice: Subject to any disclaimer, the term of this patent is extended or adjusted under 35 U.S.C. 154(b) by 0 days.

(21) Appl. No.: 10/604,873

(22) Filed: Aug. 22, 2003

(65) Prior Publication Data

US 2004/0211373 A1 Oct. 28, 2004

Related U.S. Application Data

(60) Provisional application No. 60/465,616, filed on Apr. 24, 2003.

(51) Int. Cl.[7] .................................................. F16K 1/00
(52) U.S. Cl. .................................. 123/41.1; 123/41.08
(58) Field of Search ............................ 123/41.1, 41.08, 123/41.09

(56) References Cited

U.S. PATENT DOCUMENTS

| | | | |
|---|---|---|---|
| 4,537,158 A | * | 8/1985 | Saur ........................... 123/41.1 |
| 4,550,693 A | * | 11/1985 | Saur ........................... 123/41.1 |
| 4,593,881 A | | 6/1986 | Yoshino |
| 4,609,176 A | | 9/1986 | Powers |
| 4,930,455 A | | 6/1990 | Creed et al. |
| 4,969,628 A | | 11/1990 | Reich et al. |
| 4,986,085 A | | 1/1991 | Tischer |
| 5,060,910 A | | 10/1991 | Iwata et al. |
| 5,083,745 A | | 1/1992 | Tischer |
| 5,137,255 A | | 8/1992 | Sumida et al. |
| 5,189,991 A | * | 3/1993 | Humburg .................... 123/41.1 |
| 5,255,891 A | | 10/1993 | Pearson et al. |
| 5,363,713 A | | 11/1994 | Pearson |
| 5,364,066 A | | 11/1994 | Dorste et al. |
| 5,419,531 A | | 5/1995 | Hoehn |
| 5,738,048 A | * | 4/1998 | Suzuki et al. ............... 123/41.1 |
| 5,860,595 A | | 1/1999 | Himmelsbach |
| 5,868,311 A | | 2/1999 | Cretu-Petra |
| 5,899,437 A | | 5/1999 | Quarre |
| 5,967,185 A | | 10/1999 | Baruschke et al. |
| 5,992,822 A | | 11/1999 | Nakao et al. |
| 6,155,798 A | | 12/2000 | Deininger et al. |
| 6,157,103 A | | 12/2000 | Ohta et al. |
| 6,158,714 A | | 12/2000 | Lembcke et al. |
| 6,170,492 B1 | | 1/2001 | Ueda et al. |
| 6,197,192 B1 | | 3/2001 | Smith-Haddon et al. |
| 6,228,019 B1 | | 5/2001 | Phillips et al. |

(Continued)

FOREIGN PATENT DOCUMENTS

| | | |
|---|---|---|
| DE | 1126188 B | 3/1962 |
| EP | 0 987 477 A2 | 3/2000 |
| JP | 8226564 | 9/1996 |
| JP | 11002353 | 1/1999 |

*Primary Examiner*—Henry C. Yuen
*Assistant Examiner*—Jason Benton
(74) *Attorney, Agent, or Firm*—Blackwell Sanders Peper Martin LLP

(57) ABSTRACT

A valve for regulating fluid flow and associated method of use. The valve includes a stepper motor, a first valve chamber having an inlet port, a second valve chamber having an outlet port, wherein the first valve chamber includes an opening between the first valve chamber and the second valve chamber, a first member that is rotatable and operatively attached to the stepper motor, a second member that engages the first member for linear movement of the second member between a first position and a second position when the first member is rotated by the stepper motor, and a sealing mechanism that is operatively attached to the second member, wherein the sealing mechanism can move adjacent to the opening when the second member is in the first position and the sealing mechanism can move away from the opening when the second member is in the second position.

32 Claims, 7 Drawing Sheets

U.S. PATENT DOCUMENTS

| | | |
|---|---|---|
| 6,286,464 B1 | 9/2001 | Abraham et al. |
| 6,286,764 B1 | 9/2001 | Garvey et al. |
| 6,349,920 B1 | 2/2002 | Lewis et al. |
| 6,375,086 B1 | 4/2002 | Babin et al. |
| 6,460,567 B1 | 10/2002 | Hansen, III et al. |
| 6,508,211 B1 * | 1/2003 | Asano ...................... 123/41.1 |
| 6,598,565 B2 * | 7/2003 | Fishman et al. ............ 123/41.1 |
| 6,679,201 B2 * | 1/2004 | Murakami et al. ......... 123/41.1 |
| 6,688,262 B2 * | 2/2004 | Murakami et al. ......... 123/41.1 |
| 2002/0017327 A1 | 2/2002 | Kawaai et al. |
| 2002/0189693 A1 | 12/2002 | Berto |

* cited by examiner

STEPPER MOTOR DRIVEN FLUID VALVE AND ASSOCIATED METHOD OF USE

CROSS REFERENCE TO RELATED APPLICATIONS

This patent application claims priority to U.S. Provisional Patent Application Ser. No. 60/465,616 filed Apr. 24, 2003.

BACKGROUND OF INVENTION

In many cooling systems associated with internal combustion engines, there is a requirement to control the flow of coolant in either a bypass loop or control the flow of coolant that goes into a core for a heater. This coolant flow control is currently performed with any of four (4) primary valve structures that can be driven by any one of five (5) valve control mechanisms.

In circumstances where the flow of coolant in either the bypass loop or the heater valve only needs to be turned on or turned off, a butterfly valve, a barrel valve, a poppet valve or a gate valve is typically utilized. However, when a variable flow of coolant in either the bypass loop or the heater valve is required, then only a barrel valve or a gate valve is utilized. There are five (5) mechanisms or techniques for operating the valves used in regulating the flow of coolant in either the bypass loop or the heater valve. The first mechanism is a direct mechanical linkage that is manually operated by the driver of the vehicle from the passenger compartment. The second mechanism is a blend door actuator that opens or closes a valve that is driven by a mechanical linkage. The blend door actuator functions much like an electronic temperature control system and controls the temperature. The blend door actuator controls the heat/cooling by monitoring a feedback signal from the temperature selector and electrically adjusts the blend door by means of an electric motor connected to a mechanical linkage to satisfy the request. The third mechanism is an auxiliary vacuum actuator that can position a valve in either two or three positions. The fourth mechanism utilizes a direct current (DC) motor and gear train with a feedback mechanism to indicate the variable position of a valve. Finally, the fifth mechanism is to use a direct solenoid drive to open and close a valve. This is utilized almost exclusively with poppet-type valves.

There are a number of limitations with these valves and valve control mechanisms. One significant limitation is that these valves need to be able to precisely control coolant flow in low flow ranges as well as being able to open fully to minimize pressure drop when full flow conditions are required. Poppet valves and butterfly valves provide a significant disadvantage regarding pressure drop since their flow control members remain in the flow path during full flow conditions. Barrel valves are typically used for variable flow, however, due to the geometric limitations of the barrel valve, the limited flow metering capability of the barrel valve is often gained at the expense of having adequate overall coolant flow through the barrel valve. Although gate valves can provide fine metered flow and do provide minimal pressure drop at full flow conditions, there are significant problems in size that restrict implementation in an automotive/vehicle coolant system.

Each one of the previously described valve control mechanisms has significant disadvantages. The direct mechanical linkage does not provide direct control of the valve in relation to the other heating, ventilating and air conditioning (HVAC) components in the vehicle. The indirect control of the valve via the blend door actuator also does not provide direct control of the valve in relation to the other heating, ventilating and air conditioning (HVAC) components in the vehicle. The auxiliary vacuum actuator is limited to two (2) or three (3) positions. This is of very limited value in a coolant flow control application. The direct current (DC) motor and gear train require auxiliary feedback electronics. This typically includes a potentiometer and onboard electronics to control position of the valve. This type of feedback circuit can be expensive and prone to problems due to the heat and other environmental factors associated with the vehicle. A direct solenoid control limits the valve to a two (2) position device. In order to provide flow control, the solenoid control needs to be pulsed on and off. This can create the undesirable effect of "hammering." Hammering is a phenomenon that may cause damage to a valve or cause it to fail in delivering its main function. The unstable opening and closing of a valve reveals a shortcoming in the ability to maintain constant coolant flow velocity and effective closing. Solenoid controls also have the very undesirable effect of drawing a large amount of current.

In many situations when the internal combustion engine is cooling, it is desirable for the valve to return to a full open (fail-safe) position when the operating signal to the valve is lost. Universally, all valves that are operated by a mechanical linkage fail to have this type of feature. Electrically actuated valves that are driven by a direct current (DC) motor and a gear train require an external spring or possibly a clutch mechanism to accomplish this task. Both of these additional components are undesirable since both components can fail and are difficult to replace.

The present invention is directed to overcoming one or more of the problems set forth above.

SUMMARY OF INVENTION

In one aspect of this invention, a valve for regulating fluid flow is disclosed. This valve includes a stepper motor, a first valve chamber having an inlet port for receiving fluid into the valve, a second valve chamber having an outlet port for dispensing fluid from the valve, wherein the first valve chamber includes an opening between the first valve chamber and the second valve chamber, a first member that is rotatable and operatively attached to the stepper motor, a second member that engages the first member for linear movement of the second member between a first position and a second position when the first member is rotated by the stepper motor, and a sealing mechanism that is operatively attached to the second member, wherein the sealing mechanism can move adjacent to the opening when the second member is in the first position and the sealing mechanism can move away from the opening when the second member is in the second position.

In another aspect of this invention, a method for regulating fluid flow with a valve is disclosed. This method includes rotating a first member that is operatively attached to a stepper motor within a valve, wherein the valve includes a first valve chamber having an inlet port for receiving fluid into the valve and a second valve chamber having an outlet port for dispensing fluid from the valve and the first valve chamber includes an opening between the first valve chamber and the second valve chamber, moving a second member that engages the first member between a first position and a second position when the first member is rotated by the stepper motor, moving a sealing mechanism that is operatively attached to the second adjacent to the opening when the second member is in the first position, and moving the sealing mechanism away from the opening when the second member is in the second position.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as to obscure the present invention. For example, the invention can be applied to virtually any type of device that can benefit from controlled fluid flow throughout a range of fluid flow. Moreover, this invention can be applied to virtually any type of motorized vehicle that utilizes fluid as a coolant for reducing heat in an engine, e.g., internal combustion engine. The fluid is preferably coolant; however, a wide range of fluids may suffice.

Figure 1:
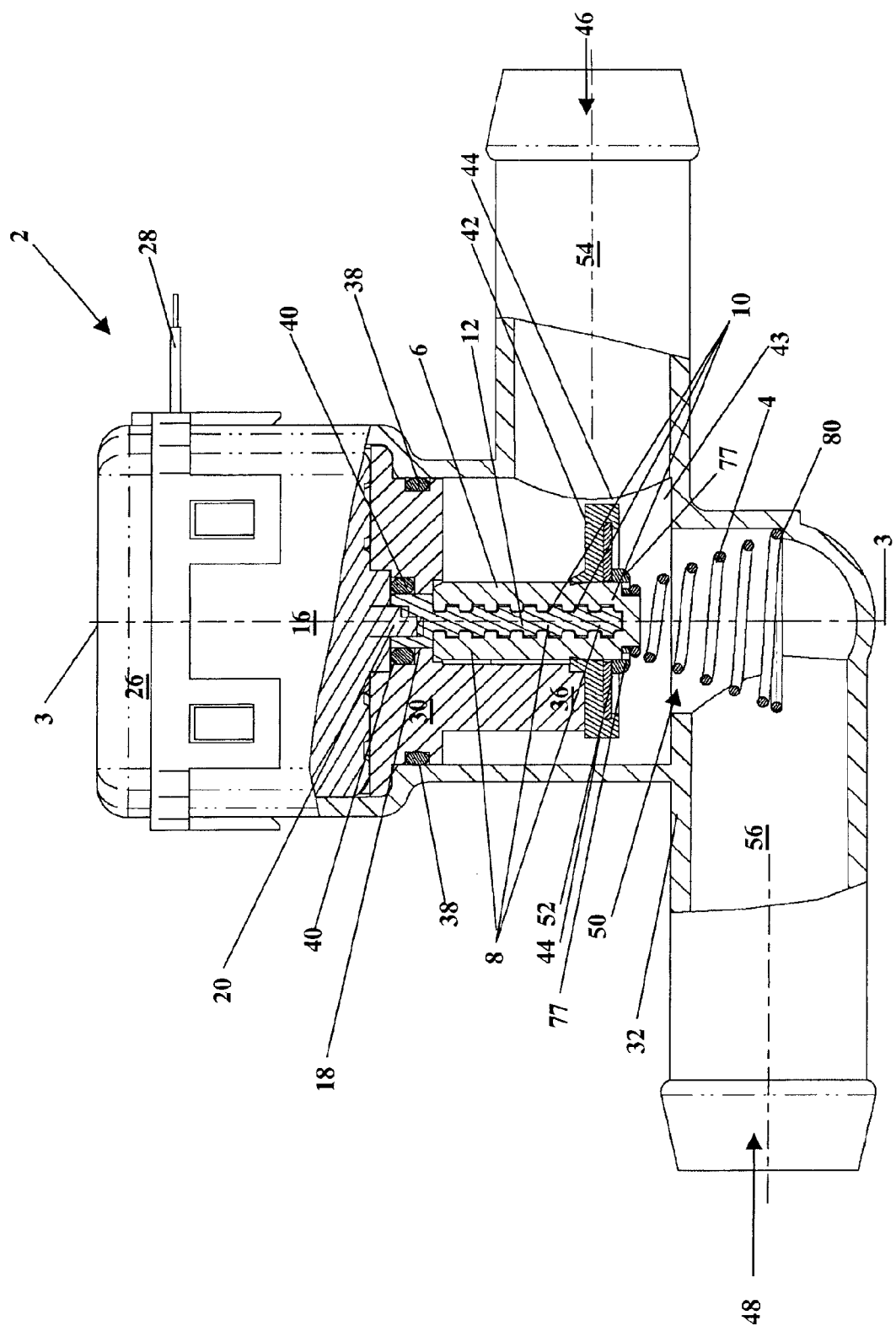
FIG. 1 is a cross-sectional view of a stepper motor driven coolant valve for delivering coolant in accordance with the present invention in an open position.
Figure 2:
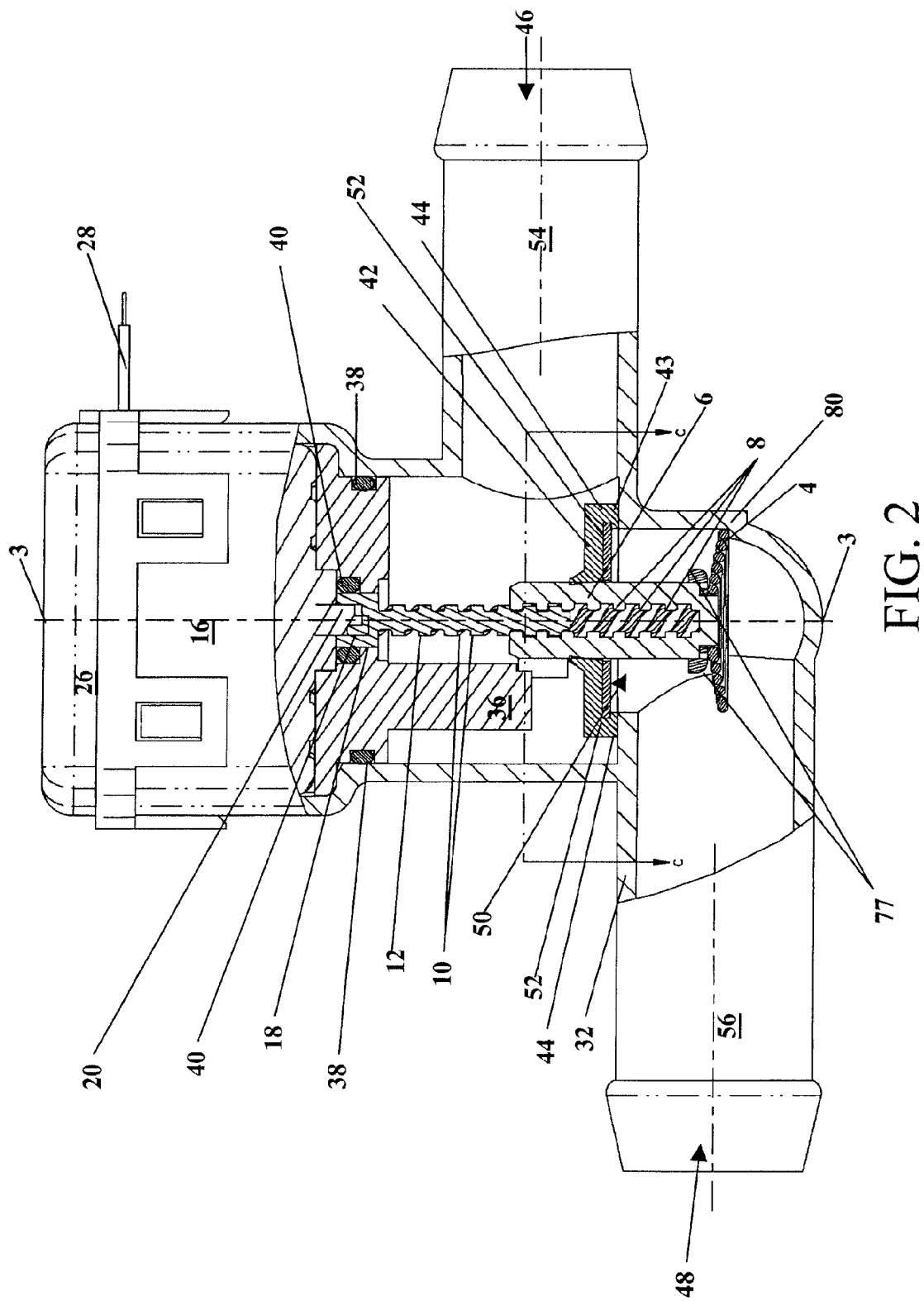
FIG. 2 is a cross-sectional view of the stepper motor driven coolant valve, as shown in FIG. 1, for delivering coolant in accordance with the present invention in a fully closed position.
Figure 4:
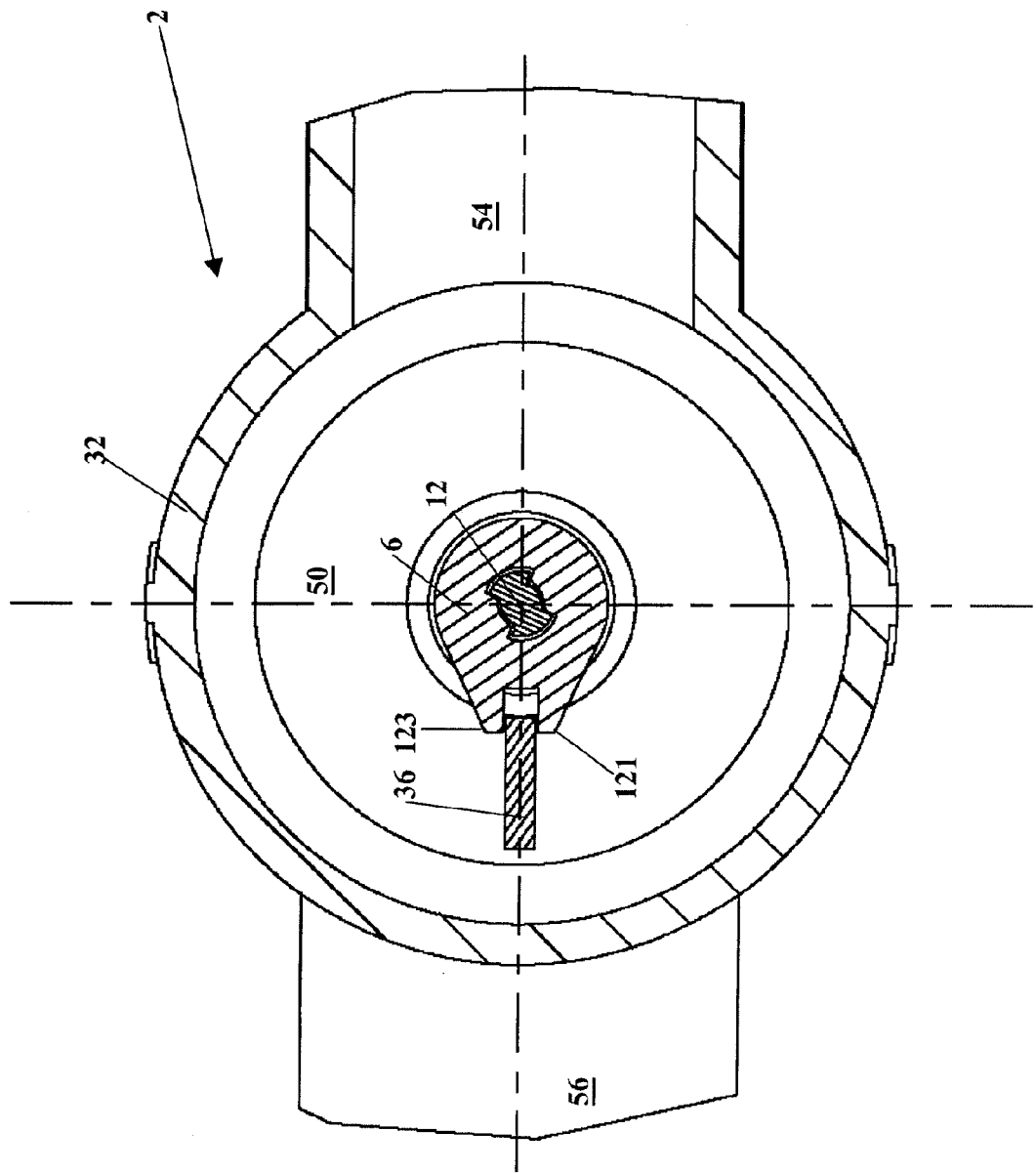
FIG. 4 is a sectional view of the stepper motor driven valve, taken along Line C—C in FIG. 2, in accordance with the present invention.
Figure 5:
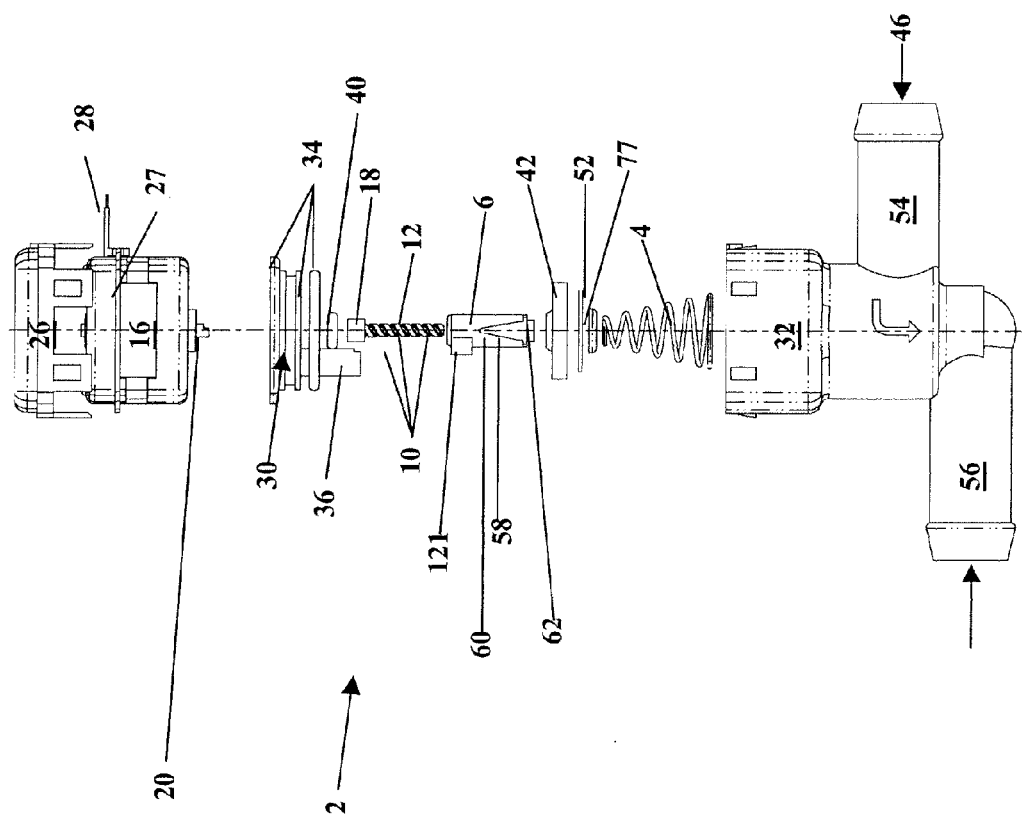
FIG. 5 is an exploded view of the stepper motor driven coolant valve, as shown in FIG. 1, for delivering coolant in accordance with the present invention.
Figure 6:
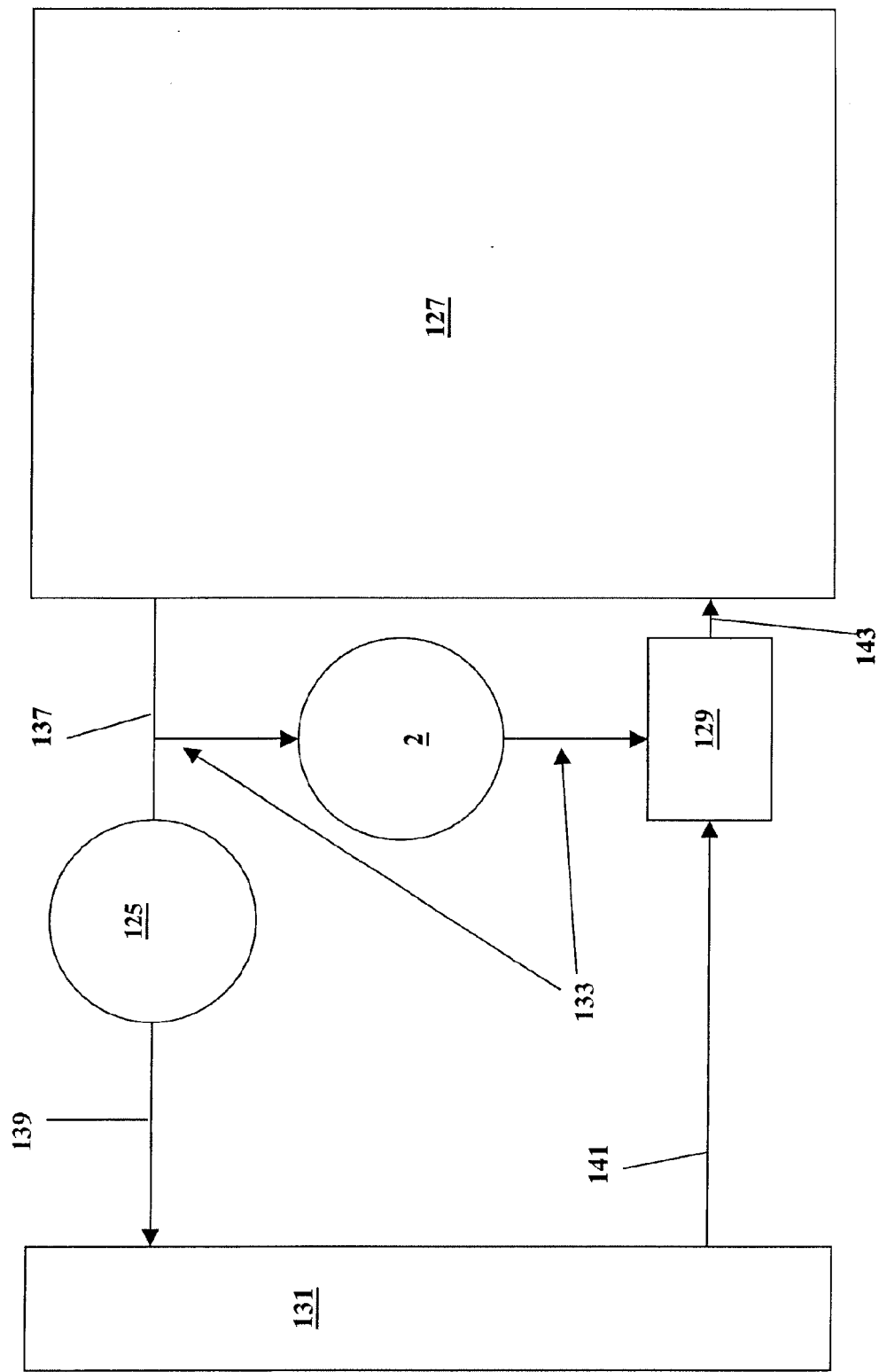
FIG. 6 is a basic schematic of a fluid, e.g., coolant, system for a vehicle that illustrates an engine, a radiator, a pump, a thermostat and a bypass loop where fluid, e.g., coolant, flow through the bypass loop is controlled by the valve of the present invention.
Figure 7:
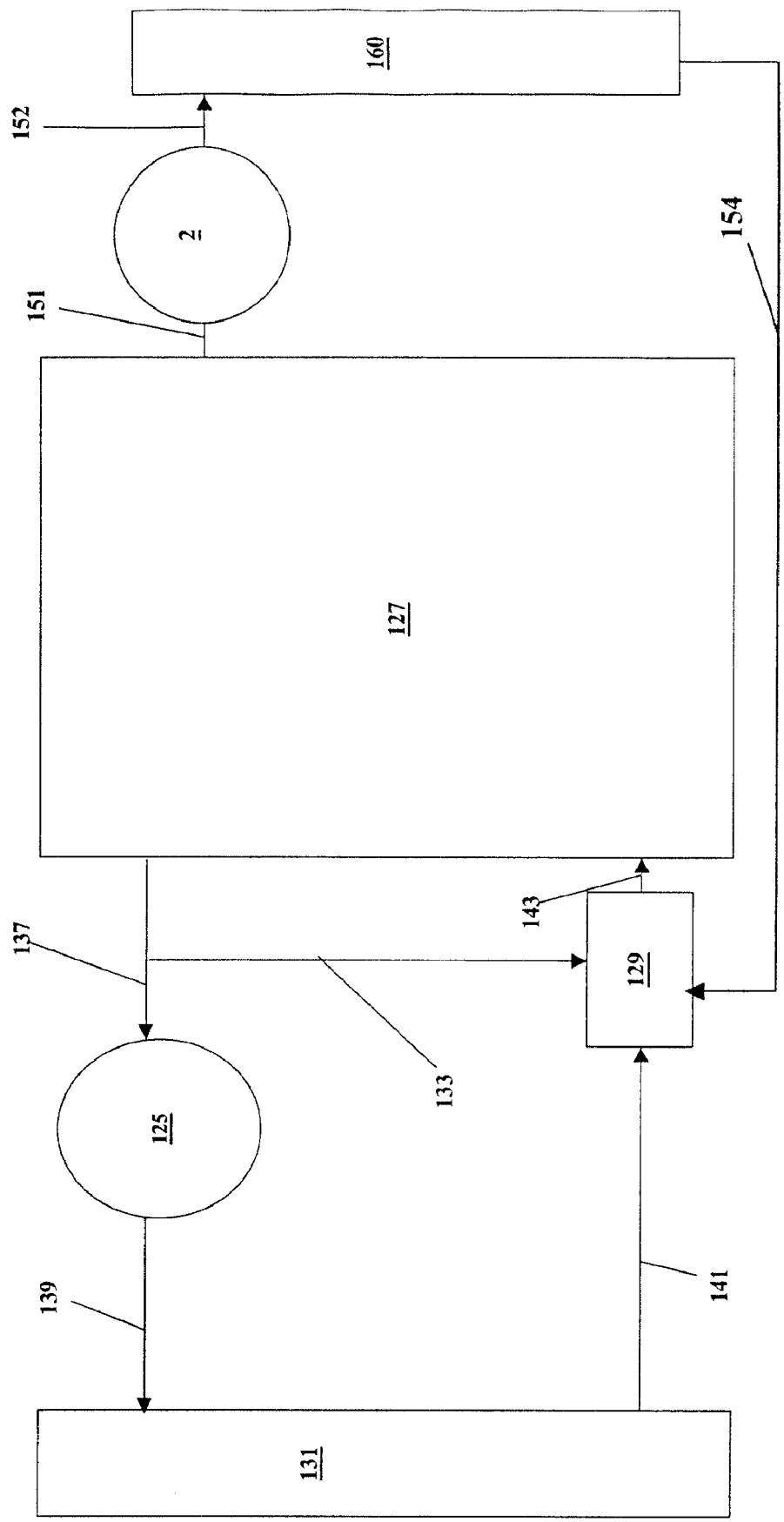
FIG. 7 is a basic schematic of a fluid, e.g., coolant, system for a vehicle that illustrates an engine, a radiator, a pump, a heater core and a bypass loop where fluid, e.g., coolant, flow through the heater core is controlled by the valve of the present invention.

Referring now to the drawings, and initially to FIGS. 1, 2 and 4, where a valve that is utilized to control fluid, e.g., coolant, flow, is generally indicated by numeral 2. The valve 2 is shown in a default or unpowered position in FIG. 1. There is a biasing mechanism 4, which is preferably, but not necessarily, in the form of a return spring. The biasing mechanism 4 if in the form of a return spring is preferably spiral and supported by a ledge 80 in a valve body 32 for the valve 2. The biasing mechanism 4 applies a load to a needle 6. This needle 6 is preferably, but not necessarily, aligned with a vertical axis or centerline 3 for the valve 2. The needle 6 preferably includes a plurality of female threads or indentations 8 that are integrally formed and located therein that are capable of mating with a plurality of male protrusions or threads 10 in a screw 12. Due to the force of the biasing mechanism, e.g., return spring, 4 there are both translational and rotational loads applied to the needle 6. Therefore, when the screw 12 rotates, the plurality of male protrusions or threads 10 engage the plurality of the female threads or indentations 8 for the needle 6 so that the needle 6 can move up or down along the vertical axis or centerline 3 depending on the direction of rotation of the screw 12. The screw 12 is operatively connected to a stepper motor 16. Preferably, the screw 12 is mechanically connected with hardware to the stepper motor 16; however, attachment by adhesives, thermal bonding and other methods will suffice. The preferred hardware is a connecting sleeve portion 18, which is preferably, but not necessarily, part of the screw 12, which connects to the rotor 20 for the stepper motor 16, as shown in FIGS. 5–7. An illustrative, but nonlimiting, example of a stepper motor 16 includes SKC Motor Number XE-2002-0962-00 manufactured by Shinano Kenshi Corp., having a place of business at 5737 Mesmer Avenue, Culver City, Calif. 90230. However, a wide variety of stepper motors 16 will suffice for the present invention.

A wide variety of materials can be utilized for the main components of the valve 2 with the exception of the stepper motor 16 and fluid sealing mechanisms. One illustrative, but nonlimiting, example includes 1503-2 grade of resin that includes nylon 6/6 that is glass reinforced. This 1503-2 grade of resin is manufactured by TICONA®, having a place of business at 90 Morris Avenue, Summit, N.J. 07901. However, a wide variety of other materials will suffice for this application. One illustrative, but nonlimiting, example of material for the plunger 6 includes an acetal copolymer. An acetal copolymer is a polyoxymethylene (POM) with a high crystallinity delivering high strength, stiffness, toughness, and lubricity over a broad range of temperatures and chemical environments. Acetal copolymers can be processed by many conventional means including injection molding, blow molding, extrusion and rotational casting. One illustrative, but nonlimiting, example of material for the screw 12 includes nylon 6 combined with polytetrafluoroethylene (PTFE) to reduce friction.

A feature of this valve 2 is the force balance between the stepper motor 16 and the biasing mechanism, e.g., return spring, 4. This valve 2 is designed so that when an appropriate signal is provided to the stepper motor 16, there is sufficient force to turn the screw 12 that moves the needle 6 to compress the biasing mechanism, e.g., return spring, 4 and close the valve 2. Conversely, there must be enough force in the biasing mechanism, e.g., return spring, 4 to turn the screw 12 to move the needle 6 that rotates the stepper motor 16 when power is removed from the stepper motor 16 to open the valve 2. The construction and design of the biasing mechanism, e.g., return spring, 4 can vary greatly to comport with the wide variety of stepper motors utilized to create to balance the force. Therefore, a feature of this invention is the ability for the valve 2 to go to a full open position as a failsafe when power is removed from the stepper motor 16.

As shown in FIGS. 1 and 2, and as best shown in FIG. 5, the stepper motor 16 includes a protective outer housing end cap 26 that covers the outer top portion of the stepper motor 16. As shown in FIG. 5, there is a gasket 27 having an electrical terminal connector 28 to provide electrical connections to the terminals (not shown) on the stepper motor 16. This electrical terminal connector 28 provides a simple electrical interface that can be easily connected to other components in an electrical control system.

Located below the stepper motor 16 is a valve body 32. There is a cover member 30 that includes a protruding member 36 that is preferably an integral portion but can be a separate part attached thereto, as shown in FIGS. 1, 2, 4 and 5. The cover member 30 is preferably, but not necessarily, made of resilient material with a series of protruding threads 34 to seal the cover member 30 to the valve body 32, as shown in FIG. 5. There is a first o-ring 38 located between the cover member 30 and the valve body 32 and a second o-ring 40 between the sleeve 18 and the cover member 18 to prevent fluid from leaving the valve body 32. An illustrative, but nonlimiting material for the o-rings 38 and 40, respectively, can include Nitrile/Buna-N type of material as well as EPDM for use at higher temperatures.

There is a poppet 42 that is attached to the needle 6. The poppet 42 includes an outer flange portion 44 that extends downward therefrom. The poppet 42 moves up and down with the needle 6. The valve body 32 includes an inlet port 46 for receiving fluid and an outlet port 48 for releasing fluid. There is a middle opening 50 located between the inlet port 46 and the outlet port 48 that separates the valve 2 into a first chamber 54 and a second chamber 56 to provide a two stage valve structure. As shown in FIG. 1, when the valve 2 is open, the needle 6 is near the stepper motor 16 and the poppet 42 is raised to allow fluid to flow between the inlet port 46 and the outlet port 48 through the middle opening 50. The poppet 42 is preferably manufactured of resilient material, e.g., quality synthetic rubber (QSR). Preferably, there is a washer 52 located underneath the poppet 42 within the outer flange portion to enhance sealing and prevent fluid flow when the valve 2 is closed. The washer 52 is preferably made of metal, e.g., brass, to provide strength and rigidity to the poppet 42. There is a retainer 77 that provides support for the poppet 42 so that the pressure of the biasing mechanism, e.g., return spring, does not put too much pressure on the center of the poppet 42 so that the relative horizontal position of the poppet 42 in relationship to the vertical axis or centerline 3 can be maintained. A wide variety of materials may suffice but the more rigid materials are preferred such as those utilized with the needle 6 or the screw 12.

Figure 3:
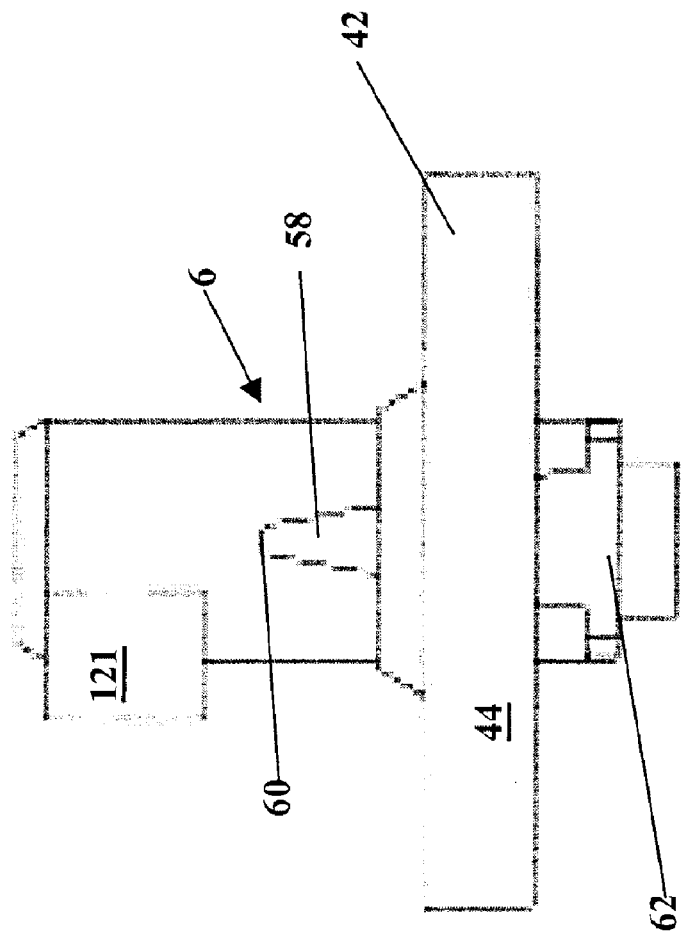
FIG. 3 is an isolated perspective view of a metering orifice, shown in FIGS. 1 and 2, utilized with the stepper motor driven coolant valve for delivering coolant in accordance with the present invention.

As shown in FIG. 2, when the valve 2 is closed, the needle 6 is as far removed from the stepper motor 16 as possible and the poppet 42 is flush against the middle opening 50 to prevent the passage of fluid from the inlet port 46 to the outlet port 48. The pressure in the first chamber 54 is generally higher than the pressure in the second chamber 56. This creates a differential pressure due to this pressure drop across the valve 2 that adds a downward force against both the needle 6 and the poppet 42. Since the needle 6 has only a small percentage of the cross-sectional area of the poppet 42, the biasing mechanism, e.g., return spring, 4 requires a much lower force to move the needle 6 then if the valve 2 had only a single stage or chamber. As shown in FIG. 3, once the needle 6 starts to move, there is a metering orifice 58 that is present on the needle that allows the pressure to balance between the first chamber 54 and the second chamber 56. This allows the biasing mechanism, e.g., return spring, 4 to have enough force to lift the outer flange portion 44 of the poppet 42 from a valve seat 43 to completely open the valve 2, as shown in FIG. 1.

Under normal operating conditions, the stepper motor 16 will be powered to rotate the screw 12 in either a clockwise or counterclockwise direction to move the needle 6 either up or down. There are two operation conditions. The first condition is the full opening region. The full opening region is from when the needle 6 is as close as possible to the stepper motor 16 to being extended to the point where the poppet 42 is still far enough away from the valve seat 43 to allow full fluid flow. The range of travel for the needle 6 from the stepper motor 16 is from about zero percent (0%) to about one hundred percent (100%), and preferably from about twenty percent (20%) to about sixty percent (60%) and optimally about forty percent (40%). There is a low-pressure differential or drop between the first chamber 54 and the second chamber 56, which is an advantageous aspect of the present invention.

The second operating condition is when the outer flange portion 44 of the poppet 42 is in full contact with the valve seat 43. At this point, there is relative motion between the poppet 42 and the needle 6 with all fluid flow is through the metering orifice 58, as shown in FIG. 3. The metering orifice is preferably, but not necessarily, tapered or triangular to precisely control the flow of fluid and allow very little fluid flow at a top portion 60 of the needle 6 and maximum flow at a bottom portion 62 of the needle 6. This provides precise metering at low fluid flow conditions, which is an advantage of the present invention The metering orifice can literally have any geometric configuration depending on the change in the rate of fluid flow that is desired.

The degrees of rotation for the stepper motor 16 can range from about zero (0) degrees per step to about one hundred and eighty (180) degrees per step and preferably from about twenty (20) degrees per step to about fifty (50) degrees per step and optimally about 1.8 degrees per step. The pitch of the screw 12 can range from about two (2) male protrusions or threads 10 per inch to about fifty (50) male protrusions or threads 10 per inch and preferably from about three (3) male protrusions or threads 10 per inch to about eight (8) male protrusions or threads 10 per inch and optimally about five (5) male protrusions or threads 10 per inch. Therefore, the needle 6 can travel from about 10 inches per step to about 0.000001 inches per step and preferably from about 0.01 inches per step to about 0.001 inches per step and optimally about 0.001 inches per step. As an illustrative example, at 1.8 degrees per step with the pitch of the screw 12 at five (5) male protrusions or threads 10 per inch and the needle 6 travelling 0.001 inches per step, results in 500 steps for the needle 6 to travel one-half (0.5) inch for very precise flow control.

The valve 2 relies on differential pressure between the first chamber 54 and the second chamber 56 for sealing the poppet 42 against the valve seat 43. When there is zero (0) differential pressure between the two chambers 54 and 56, there is a need to correct the staging for the valve 2. As shown in FIG. 2, when the valve 2 is in the full closed position and there is zero differential fluid pressure between the first chamber 54 and the second chamber 56, the relative motion between the poppet 42 and the needle 6 will not occur as intended with the outer flange portion 44 of the poppet 42 lifting away from the valve seat 43. From a sealing perspective, this is irrelevant since the fact that the differential pressure between the first chamber 54 and the second chamber 56 means that there is zero (0) flow of fluid. However, it is important that the valve 2 be in position or reset for the next stroke. This is accomplished by having the protruding member 36 for the cover member 30 force the poppet 42 to the default position, as shown in FIG. 1, whenever the valve 2 is in a full open position or default position. The aspect of providing a failsafe to a full open position for the valve 2 as a default is an advantage of the present invention.

As shown in FIG. 4, the cover member 30 includes a protruding member 36. There are preferably at least two retaining guide members 121 and 123 located on the needle 6. The protruding member 36 is positioned between the retaining guide members 121 and 123. This provides an anti-rotational feature so that the needle 6 only translates force along the centerline 3 of the valve 2.

Referring now to FIG. 6, as an illustrative, but nonlimiting application, the valve 2 can be utilized to control fluid, e.g., coolant, flow through the bypass loop 133 from the engine 127 from a first fluid conduit 137. When the standard thermostat 125 has not reached the set point temperature, all flow of fluid e.g., coolant, flow from the fluid pump 129 will go through a second fluid conduit 143 and into the engine 127. From the engine 127, fluid will flow into the bypass loop 133 via the first fluid conduit 137 and then back into the fluid pump 129. By controlling the amount of fluid flow in the bypass loop 133, the engine 127 can run hotter with greater fuel efficiency and reduced emissions. The valve 2 can be operated from sensor data from a processor (not shown) to maximize performance of the engine 127. Preferably, look-up tables can be utilized in conjunction with the sensor data. This will control the temperature of the engine 127 through a complete range of fluid flow until the set point temperature of the thermostat 125 is reached. At this point, the valve 2 can be operated in conjunction with the thermostat 125 to accurately control the temperature of the engine 127 with fluid going through the thermostat 125 via the first fluid conduit 137 and into a radiator 131 via a third fluid conduit 139. From the radiator 131, fluid goes back into the inlet for the fluid pump 129 via a fourth fluid conduit 141.

Referring now to FIG. 7, as another illustrative but nonlimiting application, the valve 2 can be utilized to control heated fluid, e.g., coolant, flow from the engine 127 via a fifth fluid conduit 151 into the inlet port 46 of the valve 2 and out through the outlet port 48 and into a heater core 160 via a sixth fluid conduit 152. The fluid, e.g., coolant, then leaves the heater core 160 via a seventh fluid conduit 154 and returns to the fluid pump 129. The remainder of the system is as described previously, with a bypass loop 133 from the engine 127 from a first fluid conduit 137. When the standard thermostat 125 has not reached the set point temperature, all flow of fluid e.g., coolant, flow from the fluid pump 129 is through a second fluid conduit 143 into the engine 127. From the engine 127, the fluid flows into the bypass loop 133 via the first fluid conduit 137 and then back into the fluid pump 129.

The valve 2 can be operated from sensor data from a processor (not shown) to maximize performance of the heater core 160. Preferably look-up tables can be utilized in conjunction with the sensor data. This will provide some control over the temperature of the heater core 160. When the set point temperature of the thermostat 125 is reached, the valve 2 can be operated in conjunction with the thermostat 125 to accurately control the temperature of the engine 127 with fluid going through the thermostat 125 via the first fluid conduit 137 and into a radiator 131 via a third fluid conduit 139. From the radiator 131 fluid goes back into the inlet for the fluid pump 129 via a fourth fluid conduit 141 and then is pumped back into the engine 127 via the second fluid conduit 143.

Although the preferred embodiment of the present invention and the method of using the same has been described in the foregoing specification with considerable details, it is to be understood that modifications may be made to the invention, which do not exceed the scope of the appended claims and modified forms of the present invention done by others skilled in the art to which the invention pertains will be considered infringements of this invention when those modified forms fall within the claimed scope of this invention.

What is claimed is:

1. A valve for regulating fluid flow comprising:

a stepper motor;

a first valve chamber that includes an inlet port for receiving fluid into the valve;

a second valve chamber that includes an outlet port for dispensing fluid from the valve, wherein the first valve chamber includes an opening between the first valve chamber and the second valve chamber;

a first member that is rotatable and operatively attached to the stepper motor;

a second member that engages the first member for linear movement of the second member between a first position and a second position when the first member is rotated by the stepper motor.

a sealing mechanism that is operatively attached to the second member, wherein the sealing mechanism can move adjacent to the opening when the second member is in the first position and the sealing mechanism can move away from the opening when the second member is in the second position; and a biasing mechanism that is in contact with the second member for returning the sealing mechanism to the second position when power is removed from the stepper motor.

2. The valve for regulating fluid flow as set forth in claim 1, wherein the stepper motor, the first valve chamber, the second valve chamber, the first member, the second member and the sealing mechanism are all enclosed within a housing.

3. The valve for regulating fluid flow as set forth in claim 1, wherein the biasing mechanism includes a return spring.

4. The valve for regulating fluid flow as set forth in claim 1, wherein the first member includes a screw having a plurality of protrusions.

5. The valve for regulating fluid flow as set forth in claim 1, wherein the second member includes a needle having a plurality of indentations.

6. The valve for regulating fluid flow as set forth in claim 1, wherein the second member includes a metering orifice to provide fluid flow between the first valve chamber and the second valve chamber, wherein the metering orifice can be selectively blocked by the sealing mechanism.

7. The valve for regulating fluid flow as set forth in claim 6, wherein the metering orifice includes a triangular shape.

8. The valve for regulating fluid flow as set forth in claim 1, wherein the sealing mechanism includes a poppet.

9. The valve for regulating fluid flow as set forth in claim 1, further including a cover member located between the stepper motor and the sealing mechanism.

10. The valve for regulating fluid flow as set forth in claim 9, wherein the cover member includes at least one protruding member that can be positioned against the sealing mechanism to secure the sealing mechanism against the opening.

11. The valve for regulating fluid flow as set forth in claim 10, wherein the at least one protruding member of the cover member that is capable of being positioned between a plurality of retaining members on the second member to restrict rotation of the second member.

12. The valve for regulating fluid flow as set forth in claim 1, further including a terminal connector mechanism that provides at least one electrical connection to the stepper motor.

13. The valve for regulating fluid flow as set forth in claim 1, wherein the inlet port for the valve is fluidly connected to a bypass loop that receives fluid flow from a engine that was pumped into the engine from a water pump, wherein the outlet port of the valve is fluidly connected to an inlet for the water pump.

14. The valve for regulating fluid flow as set forth in claim 1, wherein the inlet port for the valve is capable of fluid connection to an engine and the outlet port of the valve is capable of fluid connection to a heater core.

15. A valve for regulating fluid flow comprising:
   a stepper motor;
   a first valve chamber that includes an inlet port for receiving fluid into the valve;
   a second valve chamber that includes an outlet port for dispensing fluid from the valve, wherein the first valve chamber includes an opening between the first valve chamber and the second valve chamber;
   a first member that is rotatable and operatively attached to the stepper motor;
   a second member that engages the first member for linear movement of the second member between a first position and a second position when the first member is rotated by the stepper motor;
   a sealing mechanism that is operatively attached to the second member, wherein the sealing mechanism can move adjacent to the opening when the second member is in the first position and the sealing mechanism can move away from the opening when the second member is in the second position;
   a biasing mechanism that is in contact for returning the sealing mechanism to the second position when power is removed from the stepper motor; and
   a housing that encloses the stepper motor, the first valve chamber, the second valve chamber, the first member, the second member, the biasing mechanism and the sealing mechanism.

16. A valve for regulating fluid flow comprising:
   a stepper motor;
   a first valve chamber having an inlet port for receiving fluid into the valve;
   a second valve chamber having an outlet port for dispensing fluid from the valve, wherein the first valve chamber includes an opening between the first valve chamber and the second valve chamber;
   a screw, having a plurality of protrusions, which is rotatable and operatively attached to the stepper motor;
   a needle, having a metering orifice and a plurality of indentations, that engages the plurality of protrusions on the screw for linear movement of the needle between a first position and a second position when the screw is rotated by the stepper motor;
   a poppet that is operatively attached to the needle, wherein the poppet can move adjacent to the opening when the needle is in the first position and the sealing mechanism can move away from the opening when the needle is in the second position and selectively block the opening of the metering orifice to control fluid flow;
   a return spring that is in contact with the needle for returning the poppet to the second position when power is removed from the stepper motor; and
   a housing that encloses the stepper motor, the first valve chamber, the second valve chamber, the screw, the needle, the return spring and the poppet.

17. The valve for regulating fluid flow as set forth in claim 16, wherein the metering orifice includes a triangular shape.

18. The valve for regulating fluid flow as set forth in claim 16, further including a cover member located between the stepper motor and the poppet that includes at least one protruding member that can be positioned against the poppet to secure the poppet against the opening.

19. The valve for regulating fluid flow as set forth in claim 18, wherein the at least one protruding member of the cover member that is capable of being positioned between a plurality of retaining members on the needle to restrict rotation of the needle.

20. The valve for regulating fluid flow as set forth in claim 16, wherein the inlet port for the valve is fluidly connected to a bypass loop that receives fluid flow from a engine that was pumped into the engine from a water pump, wherein the outlet port of the valve is fluidly connected to an inlet for the water pump.

21. The valve for regulating fluid flow as set forth in claim 16, wherein the inlet port for the valve is capable of fluid connection to an engine and the outlet port of the valve is capable of fluid connection to a heater core.

22. A method for regulating fluid flow with a valve comprising:
   rotating a first member that is operatively attached to a stepper motor within a valve, having a first valve chamber having an inlet port for receiving fluid into the valve and a second valve chamber having an outlet port for dispensing fluid from the valve, wherein the first valve chamber includes an opening between the first valve chamber and the second valve chamber;
   moving a second member that engages the first member between a first position and a second position when the first member is rotated by the stepper motor;
   moving a sealing mechanism that is operatively attached to the second adjacent to the opening when the second member is in the first position; and
   moving the sealing mechanism away from the opening when the second member is in the second position by applying force against the second member with a biasing mechanism.

23. The method for regulating fluid flow with a valve as set forth in claim 22, further includes controlling the fluid flow through a metering orifice in the second member by selectively blocking the metering orifice with the sealing mechanism.

24. The method for regulating fluid flow with a valve as set forth in claim 22, further includes securing the sealing mechanism against the opening with a protruding flange member of a cover member against the sealing mechanism.

25. The method for regulating fluid flow with a valve as set forth in claim 22, further including positioning at least one protruding member of a cover member between a plurality of retaining members on the second member to restrict rotation of the second member and lessen the rotational load created by the biasing mechanism.

26. The method for regulating fluid flow with a valve as set forth in claim 22, further including:
   connecting, in fluid relationship, the inlet port for the valve to a bypass loop that receives fluid flow from an engine, wherein the engine receives fluid that was pumped into the engine from a water pump; and
   connecting, in fluid relationship, the outlet port of the valve to an inlet for the water pump.

27. The method for regulating fluid flow with a valve as set forth in claim 22, further including:

connecting, in fluid relationship, the inlet port for the valve to the engine; and connecting, in fluid relationship, the outlet port of the valve to a heater core.

28. A method for regulating fluid flow with a valve comprising:

rotating a screw, having a plurality of protrusions, which is operatively attached to a stepper motor within a valve, having a first valve chamber having an inlet port for receiving fluid into the valve and a second valve chamber having an outlet port for dispensing fluid from the valve, wherein the first valve chamber includes an opening between the first valve chamber and the second valve chamber;

moving a needle, having a metering orifice and a plurality of indentations, that engages the plurality of protrusions on the screw for linear movement of the needle between a first position and a second position when the screw is rotated by the stepper motor against a force applied by a return spring;

moving a poppet that is operatively attached to the needle adjacent to the opening when the needle is in the first position; and moving the poppet away from the opening when the needle is in the second position as well as selectively blocking fluid flow through the metering orifice based on the position of the poppet.

29. The method for regulating fluid flow with a valve as set forth in claim 28, further includes securing the poppet against the opening with a protruding flange member of a cover member against the poppet.

30. The method for regulating fluid flow with a valve as set forth in claim 28, further including positioning at least one protruding member of a cover member between a plurality of retaining members on the needle to restrict rotation of the needle and lessen the rotational load created by the return spring.

31. The method for regulating fluid flow with a valve as set forth in claim 28, further including:

connecting, in fluid relationship, the inlet port for the valve to a bypass loop that receives fluid flow from an engine, wherein the engine receives fluid that was pumped into the engine from a water pump; and connecting, in fluid relationship, the outlet port of the valve to an inlet for the water pump.

32. The method for regulating fluid flow with a valve as set forth in claim 28, further including:

connecting, in fluid relationship, the inlet port for the valve to the engine; and connecting, in fluid relationship, the outlet port of the valve to a heater core.

* * * * *